United States Patent
Kurtz

(10) Patent No.: US 8,100,018 B2
(45) Date of Patent: Jan. 24, 2012

(54) PRESSURE TRANSDUCERS EMPLOYING RADIATION HARDENED ELECTRONICS

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 363 days.

(21) Appl. No.: 12/322,799

(22) Filed: Feb. 6, 2009

(65) Prior Publication Data

US 2010/0200779 A1 Aug. 12, 2010

(51) Int. Cl.
*G01L 7/00* (2006.01)
(52) U.S. Cl. .......................................... 73/706; 73/715
(58) Field of Classification Search .................. None
See application file for complete search history.

(56) References Cited

U.S. PATENT DOCUMENTS

| | | | |
|---|---|---|---|
| 4,419,620 A | | 12/1983 | Kurtz et al. |
| 5,315,124 A | * | 5/1994 | Goss et al. ................. 250/497.1 |
| 5,432,353 A | * | 7/1995 | Goss et al. ................. 250/497.1 |
| 6,664,534 B2 | * | 12/2003 | Hjertman et al. ........... 250/231.1 |
| 7,000,478 B1 | * | 2/2006 | Zwollo et al. ................... 73/708 |

* cited by examiner

*Primary Examiner* — Lisa Caputo
*Assistant Examiner* — Jermaine Jenkins
(74) *Attorney, Agent, or Firm* — Troutman Sanders LLP; James E. Schutz; Jihan A. R. Jenkins

(57) ABSTRACT

There is disclosed a transducer employing radiation hardened electronics. Essentially a sensor assembly is positioned in a front section of a housing where the sensor assembly is coupled to an electronic module via terminals which connect the sensor to the module. The electronic module assembly is surrounded by an internal tungsten housing which is formed from a first tungsten "U" shaped cross-sectional member coupled to a second tungsten "U" shaped cross-sectional enclosure. The two members are coupled together and totally surround the electronic assembly. The members as held together are positioned within the housing by outer shell members to form a complete housing assembly whereby the electronic assembly and its associated terminal pins are totally surrounded by the tungsten holder section and the tungsten enclosure section.

11 Claims, 3 Drawing Sheets

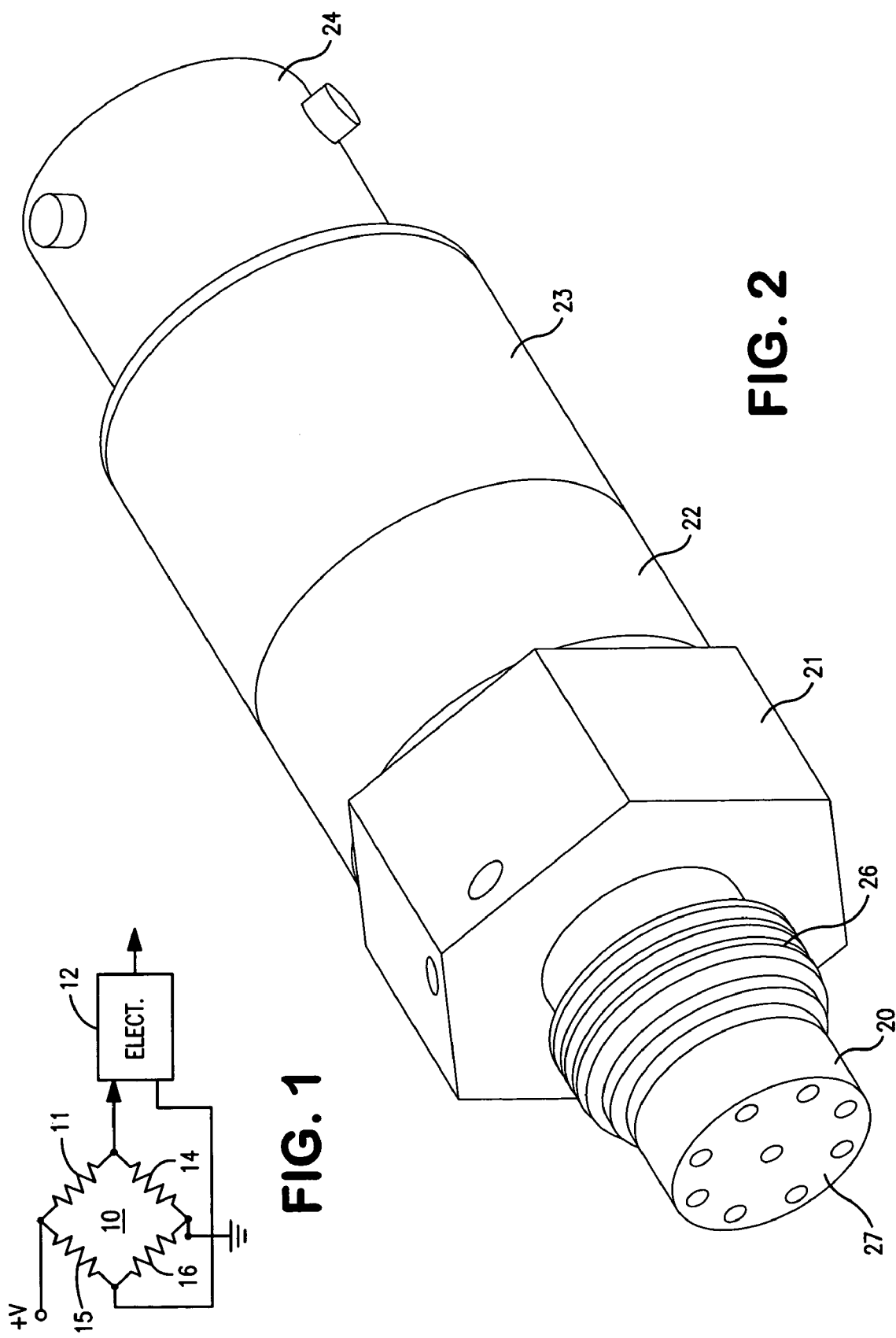

PRESSURE TRANSDUCERS EMPLOYING RADIATION HARDENED ELECTRONICS

FIELD OF THE INVENTION

This invention relates to pressure transducers and more particularly to pressure transducers employing electronic circuitry which is shielded from radiation.

BACKGROUND OF THE INVENTION

Pressure transducers are widely employed in many applications for measuring pressures in all sorts of environments. Particularly, pressure transducers are used by the military and other government agencies and are employed, for example, in aircraft, vehicles, engines, turbines, and various other environments. Pressure transducers in many instances are associated with electronic devices. While pressure transducers are relatively immune to certain types of harsh environments, the electronics are normally very sensitive and, in many cases, are isolated from the pressure transducer. One particular form of interference is radiation interference which basically is the dissemination of energy from a radiation source. Therefore, during a nuclear attack or in areas of excess radiation, the electronics can be totally destroyed rendering the pressure transducer device inoperative. Under nuclear radiation particularly gamma rays generate a large number of hole electron pairs. When the number so generated approaches the concentration of the majority carriers, in the semiconductor, the device fails. However, for degenerative doped piezoresistive sensors made with P++ silicon the hole density is on the order of $10^{20}$ atoms per cubic centimeter (cc). However, in a typical junction device the number drops to $10^{14}$ atoms per cc. Thus a PN device when subjected to radiation fails at a much lower level of radiation then does a silicon piezoresistive sensor. Thus in such applications, radiation hardened devices are necessary in order to enable pressure measurements in areas which are subjected to large amounts of radiation such as, for example, radiation which may occur after a nuclear attack. Of course it is understood that the term radiation applies to electromagnetic waves such as radio waves, infrared, light, x-rays, gamma rays and basically applies to emitted particles such as alpha, beta, protons and neutrons. Thus many types of radiation operate to destroy the electronics associated with such pressure transducers and hence render the pressure transducer totally inoperative. The electronics may be a simple amplifier or other electronics including microprocessors, memory circuits and so on, all of which can be destroyed by radiation. It is therefore an object of the present invention to provide a pressure transducer where the electronics are totally sealed and protected by a housing impervious to radiation.

SUMMARY OF THE INVENTION

A transducer apparatus employing radiation protected electronics comprising: a housing having an internal hollow, and having a front surface, said front surface having a plurality of apertures there through which apertures communicate with said hollow, a sensor assembly positioned in said hollow and located close to said front surface and communicating with said plurality of apertures, said sensor having terminals for enabling electrical contact to said sensor, an electronic assembly located in said hollow of said housing and having terminals for enabling electrical contact to said sensor terminals, a first metal radiation absorbing housing section located in said hollow enclosing and surrounding said electronic assembly, a second metal radiation absorbing housing section secured to said first section to completely enclose said electronic assembly to provide a metal radiation absorbing enclosure for said electronic assembly.

BRIEF DESCRIPTION OF THE FIGURES

FIG. 1 shows a schematic diagram of a pressure transducer having an output coupled to an electronic assembly.

FIG. 2 is a perspective view of a transducer assembly according to this invention.

FIG. 4 consists of FIG. 4A which shows a front view of the amplifier enclosure section depicted in FIG. 3 while

FIG. 5 consists of FIGS. 5A, 5b and 5C. FIG. 5A shows a front view of the electronic holder section 30 while

DETAILED DESCRIPTION OF THE INVENTION

Figure 3:
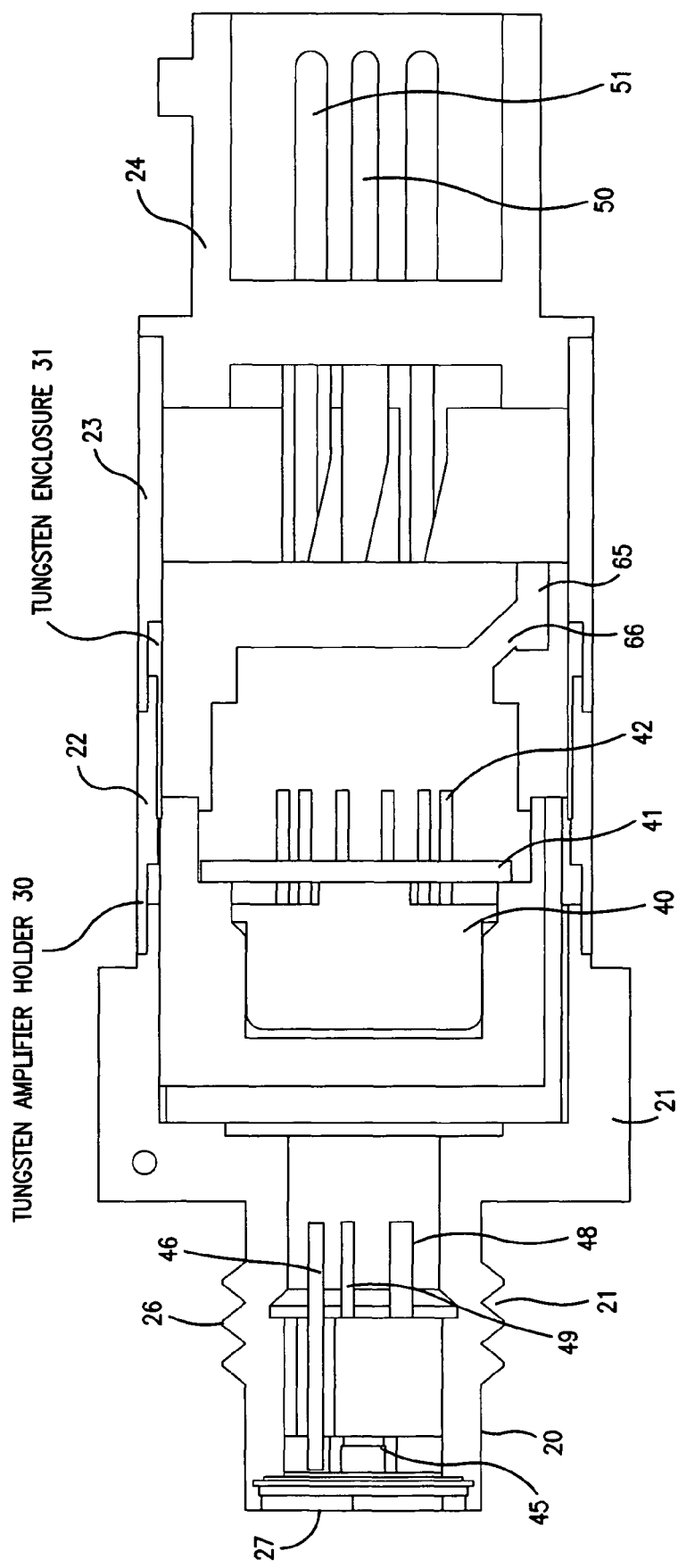
FIG. 3 is a cross-sectional view of the transducer assembly depicted in FIG. 2 showing the tungsten holder and enclosure which provides a radiation proof housing.

Referring to FIG. 1, there is shown a pressure transducer 10. The transducer 10 is normally configured as a Wheatstone bridge array and has, for example, pressure sensitive resistors as 11, 14, 15 and 16. Such resistors may be piezoresistors or may be other types of resistors whose resistance value changes upon application of a pressure or a force to a diaphragm onto which the sensors or resistors are placed. Preferably the resistors are P++ silicon piezoresistors. Thus as one can ascertain, the diaphragm or other element once deflected by an applied pressure causes the Wheatstone bridge to vary its output according to pressure. In any event, such bridges normally are coupled to an electronic assembly, such as assembly 12. In many instances, the assembly or electronics 12 may constitute an amplifier or other electronic device which is relatively simple. In other cases, the electronics may constitute micro processors and other electronics which may be analog or digital, the electronics are fabricated from semiconductor devices, which devices are relatively sensitive to radiation and which devices would be destroyed in atmospheres or environments of high radiation. For example of such electronics which may be coupled to a piezoresistive Wheatstone bridge array reference is made to U.S. Pat. No. 4,192,005 entitled Compensated Pressure Transducer Employing Digital Processing Techniques and issued to A. D. Kurtz on Mar. 4, 1980. That patent shows a semiconductor sensor configuration employing piezoresistors arranged in a bridge configuration with compensating electronics coupled to the bridge, and as indicated, which electronics may be subjected to radiation and which would be destroyed in the presence of radiation. See also U.S. Pat. No. 4,419,620 entitled Linearizing Circuits for a Semiconductor Pressure Transducer issued on Dec. 6, 1980 to A. D. Kurtz, the inventor herein, and assigned to Kulite Semiconductor Products, Inc., the assignee herein. In that patent there is shown a piezoresistive array which is coupled to two operational amplifiers and which include diode devices as well. These devices, as indicated above, can be destroyed during periods of radiation. Thus it is a desire to provide a housing for protecting the electronics during the presence of radiation and for enabling continued operation of the transducer assembly in an environment containing radiation.

Referring to FIG. 2 there is shown a transducer assembly which will be explained in more detail regarding the cross-sectional view depicted in FIG. 3. In any event, as one can ascertain, the housing has front end 20 which has a screen like member on the front surface. The front surface 27 has plurality of apertures to allow pressure to enter the section 20 which contains a pressure sensor assembly. As seen, the housing section 20 now co-acts with the housing section 21. The housing section 21 has a front end 26 containing screw threads whereby the entire transducer housing assembly can be inserted into a threaded aperture during use. The housing 21 section co-acts with a housing or shell 22 which co-acts with a back shell 23 which in turn is coupled to a connector or end housing 24.

Referring to FIG. 3 there is shown a clearer view of the various parts, including the radiation enclosure contained in the hollow of the housing. As seen in FIG. 3, the front end section 20 having the screened front 27 co-acts with a sensor 45. The sensor 45 may be a pressure sensor as for example, a Wheatstone configuration consisting of four piezoresistive elements which may be mounted on metal diaphragm or which may be otherwise secured thereto. Shown is the section 20 with the threaded aperture portion 26, as one can see there are terminals such as 49, 46 emanating from the transducer assembly 45, which terminals of course make contact with the bridge configuration on the chip 45. The sensor 45 may be a high pressure transducer having an oil-filled cavity for transmission of pressure to the sensor via a compliant or metal diaphragm. There is shown an oil fill port 48. Such configurations are well known in the art. In any event, the housing section 20 containing the bridge assembly 45 has its terminals and appropriate leads directed into the housing portion 21. Housing portion 21 has an internal hollow which contains a tungsten amplifier holder 30. The tungsten amplifier holder, as will be further explained, is part of the radiation proof enclosure for containing the electronics 40. As seen, the electronics 40 are contained in a typical header and may be amplifiers or other electronic devices as described above. In any event, the electronics 40, as indicated, a first section a subjected to radiation can be destroyed. Hence the enclosure contains an amplifier or electronics holder 30, which is a first cup like section fabricated from tungsten. The section 30 has a "U" shaped cross section. The electronics 40 are normally associated with a circuit board 41 and for example, there are shown pins or terminal pins 42 which emanate from the electronic assembly 40. A second tungsten enclosure 31 is shown. The enclosure 31 is also fabricated from tungsten and fits directly into the holder portion 30. Thus as seen, the entire electronic assembly is surrounded by a tungsten enclosure, which enclosure includes the tungsten holder portion 30 and a tungsten enclosure portion 31. Both portions are covered by a first shell 22 and a second shell portion 23 as shown, for example in FIG. 2. The shells 22 and 23 may be fabricated from a metal such as stainless steel in order to reduce cost. As is known, tungsten is relatively expensive and the two part enclosure enables one to fabricate and machine the enclosure for the device easily. Also shown in the enclosure is an aperture 65 which aperture is basically parallel to the center line of the housing assembly. The aperture 65 co-acts with a transverse aperture 66. In any event, as shown in FIG. 3, the amplifier or electronic assembly 40 is totally surrounded by a tungsten assembly consisting of the holder 30 and the enclosure 31. As seen the housing formed by 30 and 31 co-acts with the housing section 23 which contains pins such as 50 and 57, which pins eventually will be connected to the amplifier pins such as pin 42, which pins will also be connected to the sensor pins, such as pins or terminals 46 and 49. The housing section or shell 23 co-acts with connector end assembly 24 and as one can see, the sections as shown in FIGS. 2 and 3 interlock, one with the other, due to the flange like assemblies, and thus as seen in FIG. 2, sections 20, 21, 22, 23 and 24 interlock together, as for example shown in FIG. 3 and may be welded or otherwise secured together. In this manner one produces a compact assembly containing a sensor housing assembly 20 at one end with a tungsten enclosure completely surrounding the electronics as shown in FIG. 3 and the housing presenting a unique appearance being a symmetrical tubular member symmetrically disposed about a central axis, as shown, and containing a two part tungsten radiation proof housing consisting of sections 30 and 31. Both sections 30 and 31 are of a "U" shaped cross section, with the "U" shaped sections interlocking by the mating flanges. As one can ascertain, tungsten is a hard gray metal which basically is resistant to corrosion and used in cemented carbides and so on. In any event, tungsten has the highest melting point of any metal. Tungsten exhibits a low vapor pressure and has a high density and superior strength. Tungsten is relatively inert and is not attacked by common acids and so on. Tungsten has great ability to absorb radiation and therefore the electronics depicted in FIG. 3, as module 41, are fully protected by the tungsten housing.

Figure 4A:
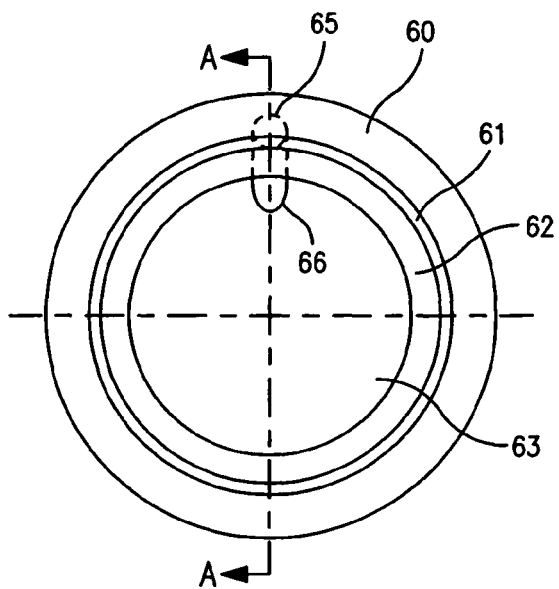
Figure 4B:
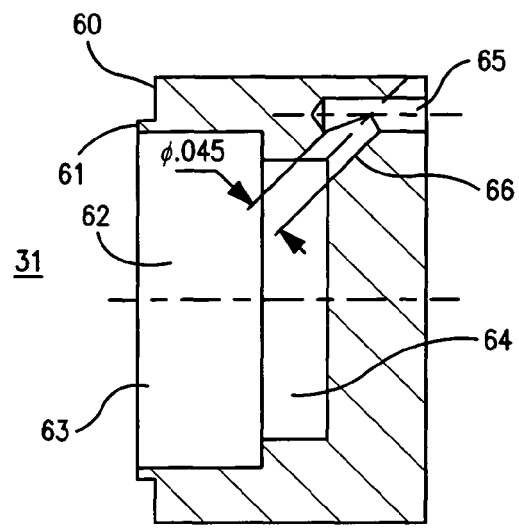
FIG. 4B shows a cross-sectional view taken through line A-A of FIG. 4A.

Referring to FIG. 4 there is shown the tungsten amplifier enclosure 31 depicted in FIG. 3. Essentially as seen in FIG. 4A there is shown a front view of the enclosure. The enclosure has a peripheral flange 60 with an up-standing flange 61. The enclosure basically has a "U" shaped cross-section as shown in FIG. 4B and has an aperture 63 which co-acts with a smaller diameter section 64. As seen from FIG. 4B, the enclosure 31 is shown in FIG. 4B in sectional view as in FIG. 3. One can see the aperture 65 and 66 which apertures co-act with the internal hollow formed by openings 62 and 64. As seen the peripheral flange 60 co-acts with the lip of the tungsten holder section 30 as seen, and both parts can be welded together. The opening accommodates wires directed from one section to the other.

Figure 5A:
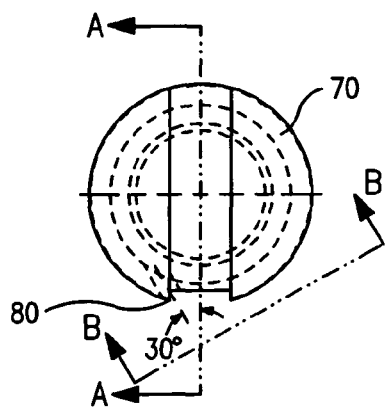
Figure 5B:
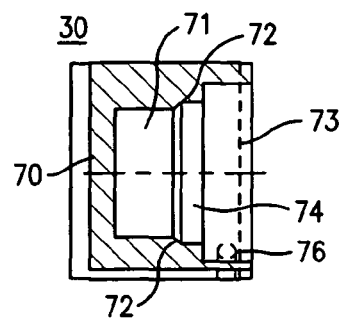
FIG. 5B shows a cross-sectional view taken through line A-A of FIG. 5A.
Figure 5C:
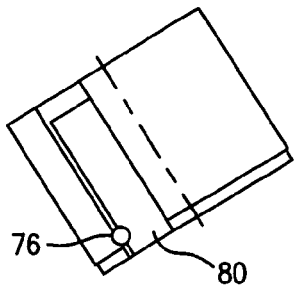
FIG. 5C shows a view of the holder assembly 30 taken from line B-B of FIG. 5A.

Referring to FIG. 5 there is shown in FIG. 5A the front view of the amplifier holder 30 shown in FIG. 3. As seen, the amplifier holder 30 has a flat top 70. The top 70 is associated with the "U" shaped unit depicted in FIG. 5B. The unit has an aperture 73 which co-acts with an aperture 71 and contains a peripheral chamfer 72. As seen there is a wedge aperture 80 located on the surface whereby through a cross-sectional view of FIG. 5c it is seen that the aperture 80 extends along the outer periphery of the shell member of the holder 30. There is shown an aperture 76. Essentially as shown in FIG. 3 the outer end of the holder 70 co-acts with the flange 60 and firmly surrounds the flange 60 so that both units can be welded or otherwise secured together to form a radiation enclosure to protect the electronics 40. The wedge channel serves as a guide to secure the units in the housing section as 21 and 22 and to make sure that the enclosure is properly aligned with respect to the sensor section containing the bridge 45. Thus, as one can see, there is provided a radiation proof enclosure for electronics, which enclosure consists of an electronic holder section 30 co-acting with an enclosure section 31. Both sections have internal apertures so that when the sections 30 and 31 are placed together there is formed an internal hollow. The electronic assembly as 40 is positioned in the hollow as 71 of the holder 30 and is secured therein as depicted in FIG. 3. The terminals which emanate from the electronics are also directed into the aperture 63 associated with the enclosure section 31. Both sections may be welded or otherwise secured or bonded together to form an enclosure and to prevent radiation from destroying the electronics 40.

Thus it should be apparent to one skilled in the art that many alternate embodiments can be discerned, all of which are covered by the claims appended hereto.

What is claimed is:

1. A transducer apparatus employing radiation protected electronics comprising:
   a housing having an internal hollow, and having a front surface, said front surface having a plurality of apertures there through which apertures communicate with said hollow,
   a sensor assembly positioned in said hollow and located close to said front surface and communicating with said plurality of apertures, said sensor having terminals for enabling electrical contact to said sensor,
   an electronic assembly located in said hollow of said housing and having terminals for enabling electrical contact to said sensor terminals,
   a first metal radiation absorbing housing section located in said hollow enclosing and surrounding said electronic assembly,
   a second metal radiation absorbing housing section secured to said first section to completely enclose said electronic assembly to provide a metal radiation absorbing enclosure for said electronic assembly.

2. The transducer according to claim 1 wherein said metal radiation absorbing housing sections are fabricated from tungsten.

3. The transducer according to claim 1 wherein said sensor assembly is a piezoresistor sensor assembly.

4. The transducer according to claim 1 wherein said electronic assembly includes an amplifier.

5. The transducer according to claim 1 wherein said housing has a front section coupled to a second shell section to form an outer housing shell having said internal hollow.

6. The transducer according to claim 1 wherein said sensor assembly has a metal diaphragm capable of deflecting according to an applied pressure.

7. The transducer according to claim 1 wherein said first and second metal housing sections each have a "U" shaped cross-section, with the arms of said "U" shaped sections coupled to each other to form a metal enclosure for said electronic assembly.

8. The transducer according to claim 7 wherein said sections are welded together.

9. The transducer according to claim 1 wherein at least one metal section has a guiding location channel on a surface thereof.

10. The transducer according to claim 1 wherein said sensor assembly is a Wheatstone bridge array.

11. The transducer according to claim 10 wherein said sensor is a pressure sensor.

* * * * *